R. E. JORDAN.
DEHAIRING MACHINE.
APPLICATION FILED SEPT. 20, 1920.
1,388,572.
Patented Aug. 23, 1921.
5 SHEETS—SHEET 1.
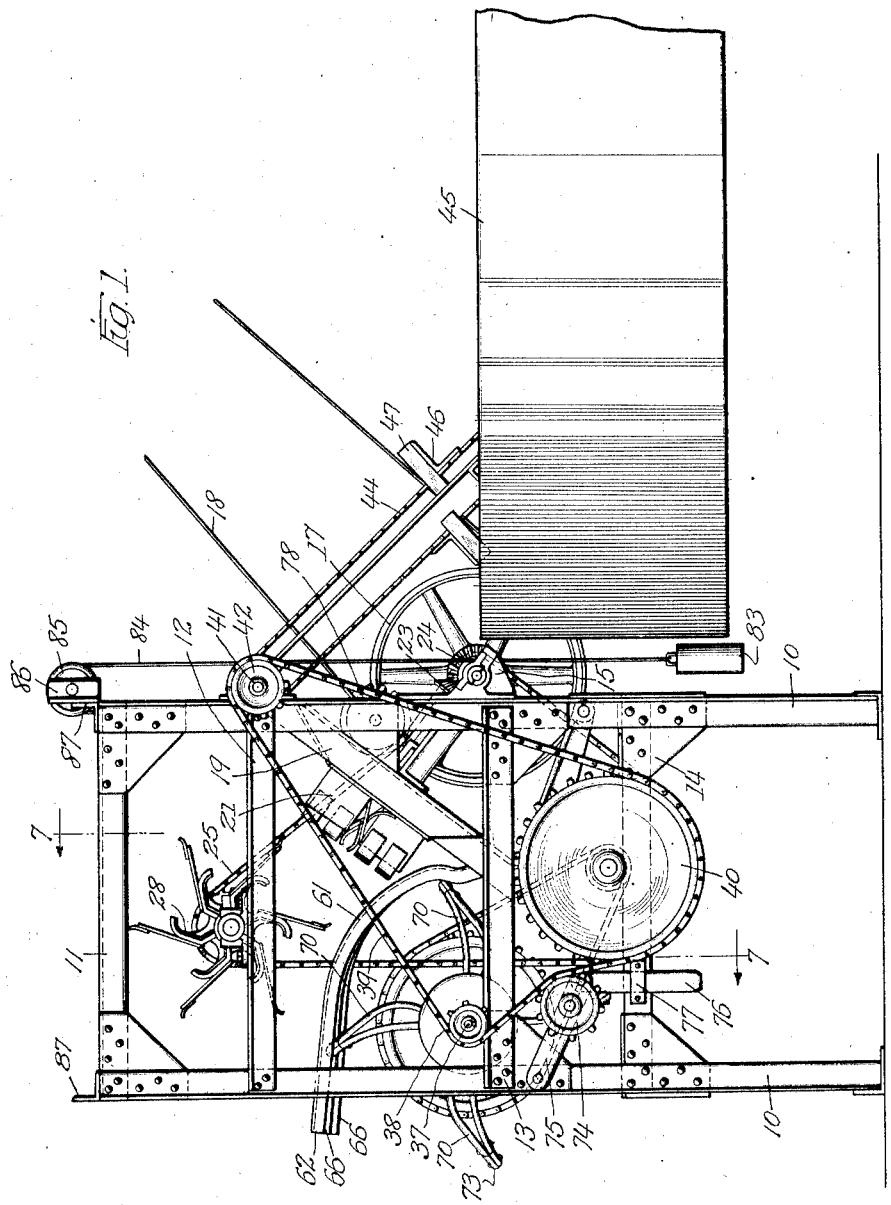

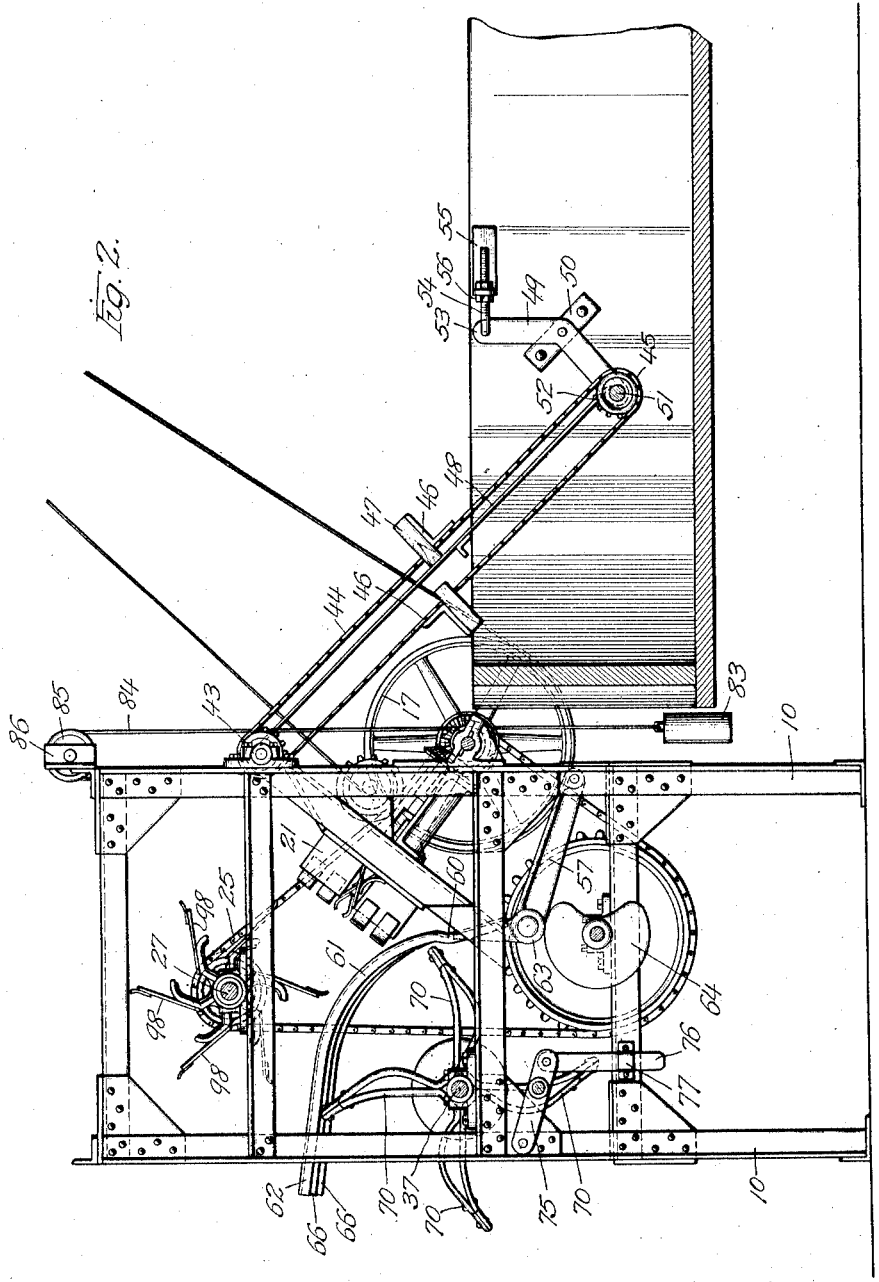

R. E. JORDAN.
DEHAIRING MACHINE.
APPLICATION FILED SEPT. 20, 1920.
1,388,572.
Patented Aug. 23, 1921.
5 SHEETS—SHEET 3.
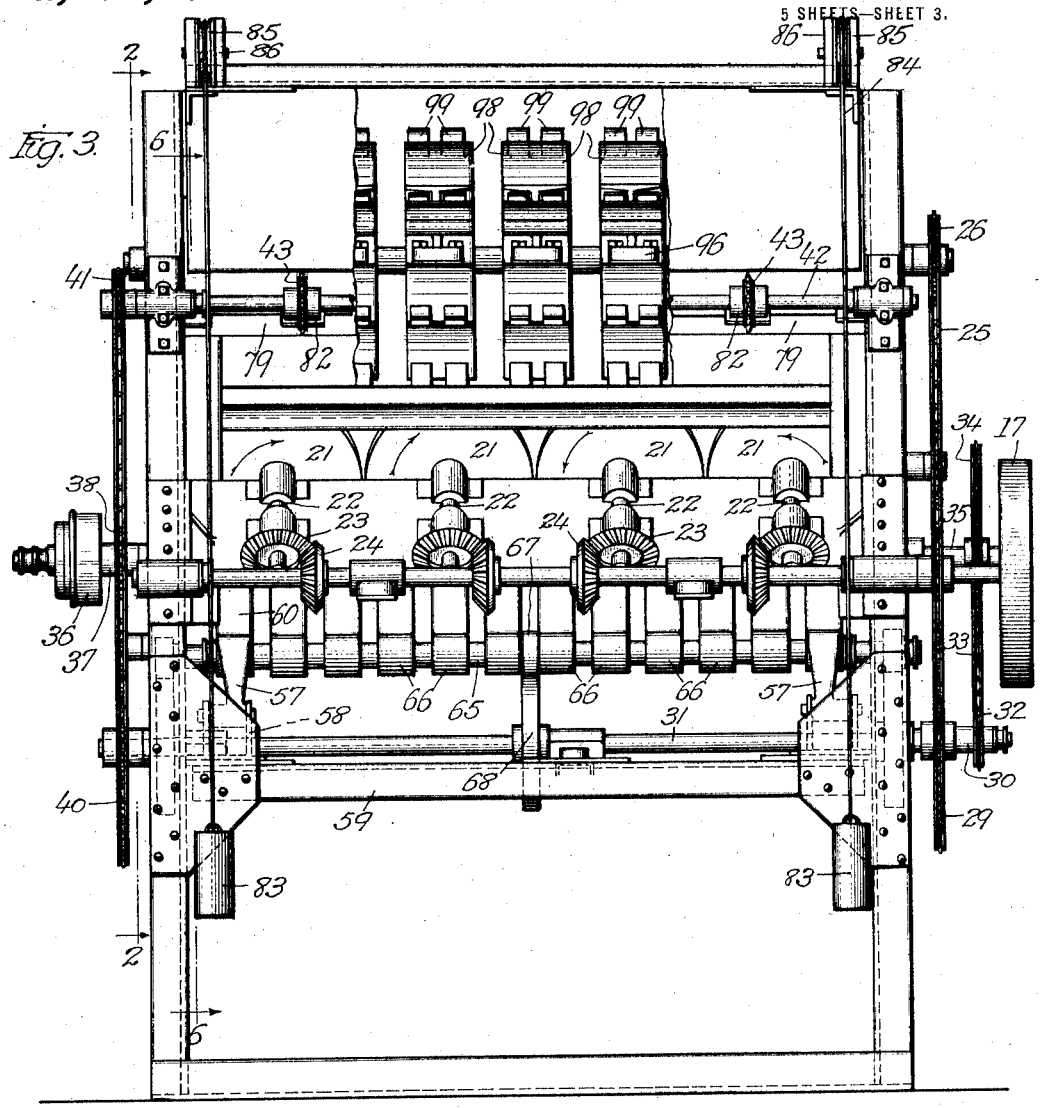
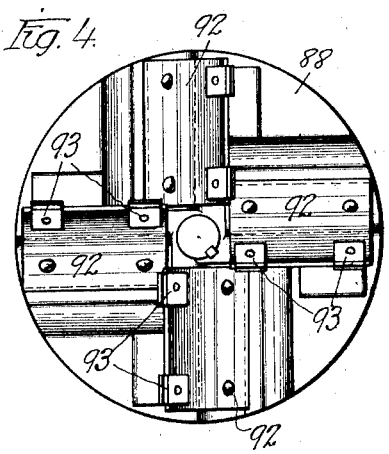
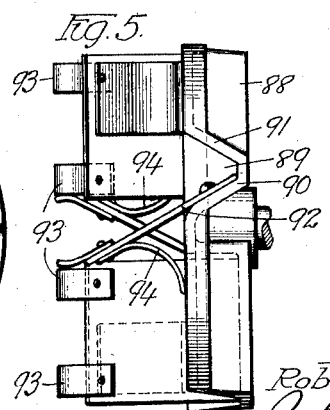
Inventor
Robert E. Jordan

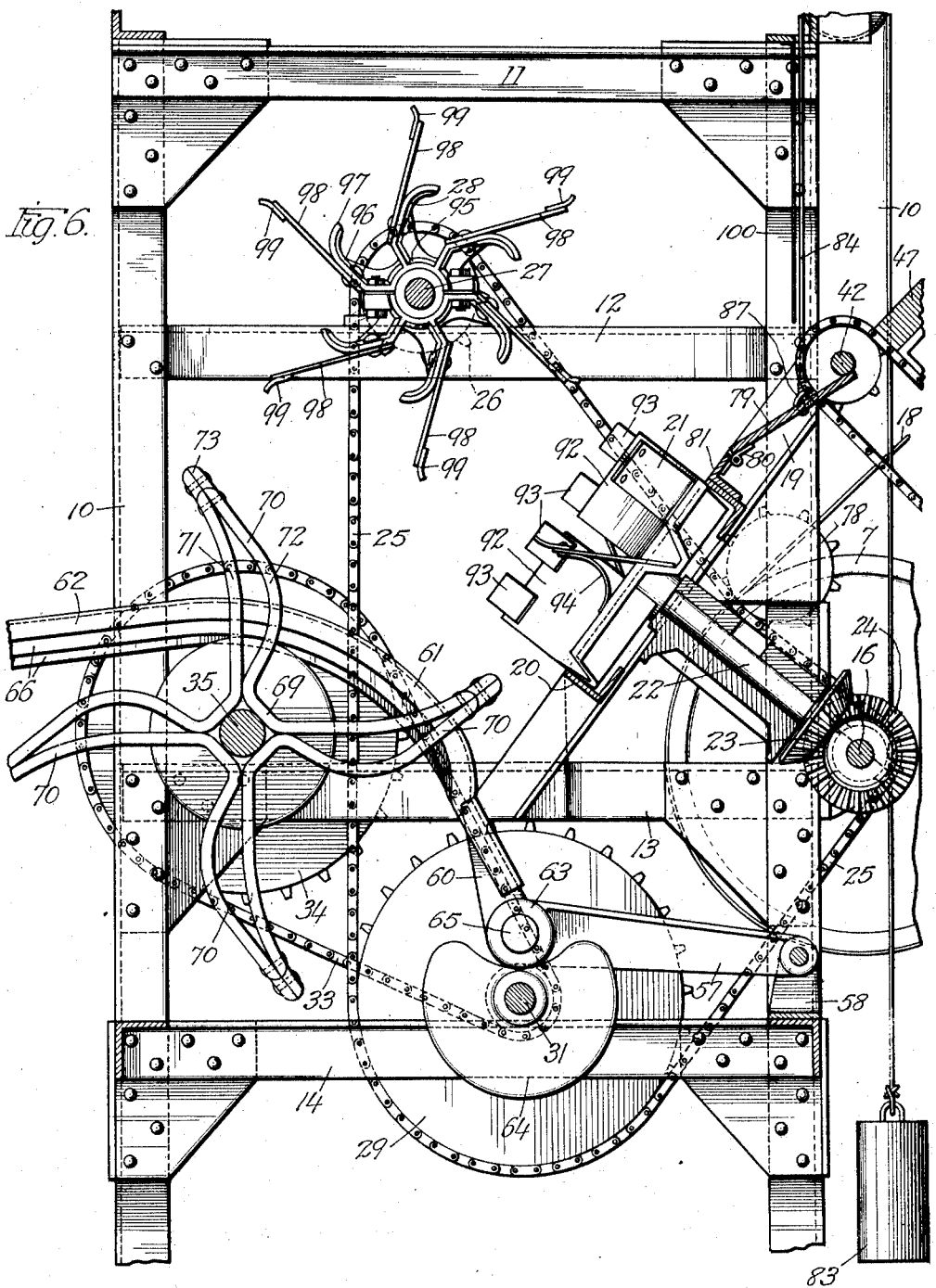

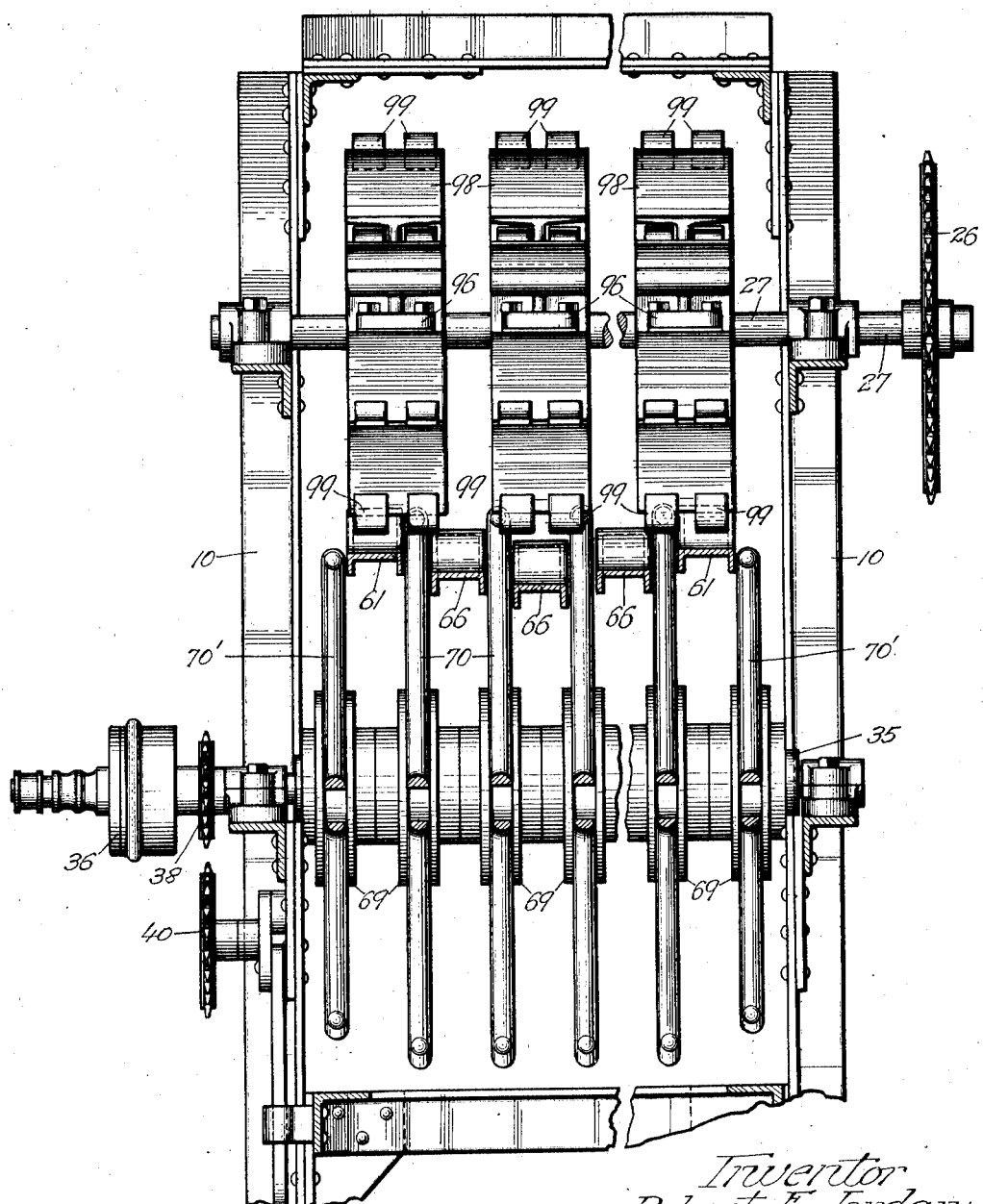

UNITED STATES PATENT OFFICE.

ROBERT E. JORDAN, OF CHICAGO, ILLINOIS, ASSIGNOR TO THE PACKERS MACHINERY & EQUIPMENT CO., OF CHICAGO, ILLINOIS.

DEHAIRING-MACHINE.

1,388,572.          Specification of Letters Patent.     Patented Aug. 23, 1921.

Application filed September 20, 1920. Serial No. 411,367.

*To all whom it may concern:*

Be it known that I, ROBERT E. JORDAN, a citizen of the United States, residing at Chicago, in the county of Cook and State of Illinois, have invented a certain new and useful Improvement in Dehairing-Machines, of which the following is a full, clear, concise, and exact description, reference being had to the accompanying drawings, forming a part of this specification.

This invention relates to dehairing machines, and more particularly to machines for dehairing and scraping hogs or other carcasses.

It is a purpose of this invention to provide a hog dehairing machine of large capacity, that is compact in structure and rapid and efficient in operation. A machine of the character embraced in this invention is capable of efficiently dehairing 225 hogs per hour or 300 pigs per hour.

It is a further purpose of the invention to provide a hog dehairing machine having the rapidity of operation above set forth that does not damage or injure the carcass. It is also a purpose of the invention to provide a machine of the above character that can be operated on much less power for the same capacity than other commercial forms of machines of the same capacity, the present invention requiring only 10 horsepower to operate a machine with a capacity of 225 hogs per hour, whereas other forms of machines of this capacity require 60 horsepower.

This saving of power is accomplished by the structure and mode of operation of the machine, and by the speed of rotation at which it is possible to drive the lower hog dehairing elements. These lower hog dehairing elements have a motion in an arcuate path relatively to the carcass about an axis substantially perpendicular to the surface acted upon, which produces a circular rubbing or massaging and scraping action rather than a slapping and scraping action as has been previously the case. The speed of the dehairing elements has been previously limited due to the fact that when dehairing elements are used that have a slapping motion, the rapid rotation of these elements would cause the carcass to be struck such sharp blows thereby that the flesh would be bruised and the quality of the meat injured.

It is a further purpose of the invention to provide a dehairing machine with lower dehairing elements having the circular rubbing motion referred to above and with upper flexible rotating elements that are adapted to hold large hogs down in contact with said lower dehairing elements and aid in dehairing said hogs. The upper dehairing elements are made in the form of beaters which extend in a non-radial direction from the axis of rotation thereof. The rapidly rotating lower beaters have the advantage of massaging the skin of the hog or pig and thus thoroughly loosening the hair and removing the same from any hollow portions of the carcass, as, for example, under the shoulders thereof and also removing the toe nails.

It is a still further object of the invention to provide suitable means for holding the carcasses in position while in the machine, said holding means comprising a plurality of supporting arms, which are shaped to conform somewhat closely to the contour of the carcass, thus holding the head and feet in such a position that they are properly acted on by the lower dehairing elements. These supporting arms are so mounted as to be capable of being lowered from their normal position whereupon suitable ejecting devices are permitted to operate on the carcass.

It is a still further purpose of the invention to provide a means for lifting and rotating the carcass while being acted on by the dehairing elements and to so construct this means that it will also eject the hog when this is desired. It is an object of the invention to provide a spider for this purpose that is rotating constantly and whose arms serve to lift and rotate the carcass when the supporting arms are in their normal position and which arms serve to eject the carcass from the machine when the supporting arms are in their lowered position.

It is another object of the invention to provide means whereby the supporting arms are lowered at regular intervals, this means comprising cams supporting the intermediate portions of the supporting arms. It is also a purpose of the invention to provide means for throwing the said cams out of operation when it is desired to keep a carcass in the machine for a longer interval than is provided for by the cam mechanism. It is a further purpose of the invention to so construct the supporting arms and arms of the spiders, as to allow the hair to drop through the spaces between them to the bottom of the machine.

Other objects and advantages of the invention will appear as the description of the accompanying drawings, showing one form that the invention may take, proceeds. However, I desire to have it distinctly understood that I do not intend to limit myself to the exact details of structure shown in the drawings and described in the specification, but intend to include therein, any such changes in structure or modifications of the structure shown and described as would occur to those skilled in the art to which this invention relates and which would fall within the scope of the claims.

In the drawings:

Figure 1 is a view in side elevation of my improved hog dehairing machine the side inclosure of the machine being removed to reveal the interior thereof, showing the supporting means in normal position;

Fig. 2 is a section on the line 2—2 of Fig. 3, with portions of the driving mechanism omitted for the sake of clearness, showing the parts in the same position as in Fig. 1;

Fig. 3 is an end view of the machine looking toward the end of the machine at which the hog enters the same, portions thereof being shown as being broken away to reveal the interior structure thereof;

Fig. 4 is a face view of one of the lower hog dehairing elements;

Fig. 5 is an edge view of the same;

Fig. 6 is an enlarged sectional view taken on the line 6—6 of Fig. 3 showing the supporting elements in depressed position;

Fig. 7 is an enlarged section taken on line 7—7 of Fig. 1, certain parts of the structure being broken away.

Referring in detail to the drawings the improved hog dehairing machine comprises a framework having a plurality of uprights 10 connected together at the top thereof by transverse members 11 and having intermediate transverse members 12 and 13 and a bottom transverse member 14. Suitably mounted on brackets 15 is the main driving shaft 16 carrying the main driving pulley 17 driven from a suitable source of power by means of a belt 18. Secured to the transverse members 13 of the framework and to two of the uprights 10 is the diagonally extending supporting member 19 which is provided with suitable socket portions 20 within which the dehairing elements 21 are adapted to operate. The dehairing elements 21 are provided with shafts 22 which extend downwardly in a diagonal direction from the dehairing elements. Each of the shafts 22 is provided with a bevel gear 23 meshing with a bevel gear 24 on the main drive shaft 16.

Referring to Fig. 3 it will be seen that the bevel gears on the shaft are arranged in pairs so as to be faced in opposite directions so as to drive the dehairing elements in opposite directions of rotation, the pair of dehairing elements at the right of Fig. 3 turning in one direction and the pair of dehairing elements at the left of Fig. 3 turning in the opposite direction. The direction of rotation of the elements is as shown by the arrows in Fig. 3, those at the right of the machine turning in a counter-clockwise direction and those at the left of the machine turning in a clockwise direction. It has been found by the arrangement of the dehairing elements in this manner that the tendency to throw the carcass that is being dehaired in any given direction by one of the dehairing elements is neutralized by the action of the other dehairing elements. It has been found that by having the dehairing elements that are near the center of the machine rotating in such directions that the adjacent peripheries thereof will both be moving downwardly that the tendency will be to throw the carcass in a forward direction rather than rearwardly toward the opening of the dehairing machine where the carcass enters the same. The sprocket chain 25 passes over a suitable sprocket keyed to the shaft 16 and over a sprocket 26 that is keyed to the shaft 27 carrying the rotating beater elements 28 and over the large sprocket 29. The beaters 28 will be rotated in a counter-clockwise direction as they appear in Fig. 6 by the rotation of the main drive shaft. The sprocket 29 is keyed on a sleeve 30 and is free to rotate on a shaft 31 extending transversely of the machine. Keyed to the sleeve 30 is a sprocket 32 over which the sprocket chain 33 runs, the sprocket chain 33 driving the sprocket 34 on the transverse shaft 35 provided at one end thereof with a clutch mechanism 36 whereby the stub shaft 37 carried by the clutch member and provided with the sprocket 38, can be thrown into and out of operation. The sprocket chain 39 passes over the sprocket 38 and over the large sprocket 40 and small sprocket 41. The large sprocket 40 is keyed to the transverse shaft 31 and is for a purpose that will presently be described. The sprocket 41 is keyed to a shaft 42 carrying the sprockets 43 over which pass the side chains 44 of the conveyer used for raising the carcasses from the scalding tank 45 into the machine. The conveyer comprises the side chains 44 having the angles 46 secured thereto for securing the blocks 47 which extend transversely from one side chain to the other to the side chains. The blocks 47 are adapted to slide along the surface of a sheet metal plate 48 and act as pusher bars to move the hogs upwardly along the plate 48 from the scalding tank to the dehairing machine.

In order to adjust the tension on the chains 44 a bell crank lever 49 is pivotally secured to the scalding tank at 50 and has the lower end portion thereof provided with suitable means for supporting the sheet metal member 48 and with means to provide a bearing for the shaft 51 on which is mounted the sprocket 52. The opposite end of the arm is provided with an eye at 53 engaged by an eye bolt 54 which has the threaded end portion thereof passing through an eye and an angle plate 55 secured to the side of the scalding tank, the bolt being provided with suitable nuts 56 whereby the end 53 of the bell crank lever 49 can be moved either toward or away from the member 55 whereby the tension of the chains 44 can be either increased or diminished.

Pivotally mounted on brackets 58 on the transverse member 59 are the arms 57, there being one arm at each side of the machine. Each of the arms 57 is provided with an extension 60 which extends at an obtuse angle to the arm 57 and then extends in a long sweeping curve shown at 61 in the drawings to the substantially straight portion 62. At the point where the portion 57 and the extension 60 meet each of the arms is provided with a roller 63 which coöperates with a cam 64 that is keyed to the shaft 31. The arms 57 are each keyed to a shaft 65 extending transversely of the machine which has keyed thereto a plurality of curved arms 66 each of which has substantially the shape of the portions 61 and 62 of the extension of the member 57. The arms 66 and the extension of the arms 57 are each made in the form of a channel that is inverted and together form a support for the carcass while it is in the machine to be dehaired. The supporting arms comprising the end members 61 and the intermediate members 66 are bent on a slightly different curvature from the end members to the middle members so that the members collectively conform substantially to the contour of the carcass, that is the end members 61 and the intermediate members 66 adjacent thereto are higher near the dehairing elements 21 and have a sharper curvature than the members 66 adjacent thereto and the members 66 more nearly toward the center of the machine are still lower and have a still greater radius of curvature. The purpose of having the supporting arms conform to the contour of the carcass is to bring the rear portion and other smaller portions of the carcass to substantially the same position relative to the dehairing elements as the main body portion so that the dehairing elements will act substantially the same way on all parts of the carcass. The rollers 63 on the supporting arms are shown as engaging the raised portion of the cams 64 in Figs.

1 and 2 and when in this position the arms 61 and arms 66 will be in the raised position shown in Figs. 1 and 2, which is the normal supporting position for the carcass while the dehairing elements are acting thereon.

In Fig. 6 the arms are shown as having been lowered due to the depressed portion of the cam 65 coming into engagement with the roller. As the arms 66 are keyed to the same shaft as the arms 57 having the extension 61 all of the arms will move in unison.

Referring to Fig. 3 it will be seen that the shaft 65 is provided with an additional roller 67 coöperating with the centrally mounted cam 68 which is keyed to the shaft 31 and operates coincidentally with the cams 64. Mounted on the shaft 35 to turn therewith are the spiders 69, one of these spiders being mounted between each pair of supporting arms and one on each side of the outer supporting arms. The spiders 68 comprise the curved arms 70 which are here shown as comprising a strap metal member 71 having a relatively long curvature and a strap metal member 72 having a sharper curvature, the two members being secured together at their ends and rounded to form a round nosed pointed portion 73. However, these members may be made of cast metal having the outer contour shown. The members 70 are curved in the direction of their travel in turning about the shaft 35 thus forming hook-like throw out arms for ejecting the carcass from the machine after the dehairing operation is completed. The arms 70 do not act to throw the carcass out of the machine until the cams have come into the position shown in Fig. 6, when the supporting arms for the carcass will be lowered sufficiently to enable the carcass to come into contact with the major portion of the curved arms 70 of the spiders so as to be gripped by the same and be ejected from the machine. When the parts are in the position shown in Figs. 1 and 2 the throw out arms 70 project only slightly through the spaces between the arms 61 and 66 and only extend therethrough to such an extent that the blunt nosed end portion 73 only projects beyond the arms that support the carcass and come into contact with the carcass. When the parts are in this position the spiders act merely as turning means for the carcass so as to present various portions thereof to the dehairing elements. It is sometimes desirable when dehairing an unusually large carcass that the time be extended that the same remains in the normal position in contact with the dehairing elements. In order to make it possible to keep the carcass in the machine for a longer period than merely for one revolution of the shaft 31, it is necessary to throw out the cam mechanism mounted on the shaft.

For this reason the clutch 36 is provided. However, while the ejecting operation is postponed, it is necessary that the arms 70 of the spiders continue to revolve to turn the carcass. It will be seen on referring to Figs. 1, 3, and 6 that the sprocket 29, which is driven from the main shaft 16 by means of the chain 25, has mounted to turn therewith the sprocket 32 which drives the sprocket 34 on the shaft 35 by means of the chain 33. The shaft 35 has the spiders 69 mounted to turn therewith and it will thus be evident that as long as the main shaft is being driven the spiders will revolve. However, the clutch 36 can be thrown into and out of engagement with the shaft 35, and mounted to turn with the clutch member is the sprocket 38 over which passes the chain 39 which engages with the sprocket 40 that drives the shaft 31 and which also drives the conveyer mechanism through the sprockets 41, thus when the clutch is thrown out the main shaft will cease to revolve and the conveyer mechanism will also stand idle. This is necessary as it would be undesirable to permit a second carcass to enter the dehairing machine while the first carcass is being held therein due to the fact that the movement of the supporting arms into and out of normal supporting position, is halted.

Referring to Fig. 1 it will be seen that an idler sprocket 74 is provided for engaging the sprocket chain 39 and that the idler sprocket 74 is mounted on an arm 75 pivoted to the framework, which is pivoted to an arm 76, mounted to slide between the framework and the strap 77 secured thereto, suitable means being provided for clamping the slidable member 76 in any desired position. In this way the tension on the sprocket chain can be adjusted so as to cause the same to properly engage with the gears 38 and 40. Referring to Figs. 2 and 6 it will be seen that a sprocket 78 is provided that operates in a similar manner to the sprocket 75 engaging with the chain 25 to properly tension the same.

When the carcass is in position on the supporting arms and rests partially on the lower dehairing elements 21, it will be seen that the carcass will be located in a substantially V-shaped recess or wedge-shaped groove between the supporting arms and the lower dehairing elements. However, the upper beaters 28 and the turning elements 70 will be constantly turning the carcass while in this position. It will be noted on reference to Fig. 7 that the arms 70' of the outermost spiders are shorter than the remaining ones. This is done in order not to turn and lift the head portions of the carcass. It is necessary in dehairing a carcass that the head portions rest closer to the dehairing elements and are operated on by them for a longer period of time than the remaining portions of the carcass, as it is the head and neck portions of the carcass that are the hardest to clean.

Due to the action of the beaters and the dehairing elements a carcass would be liable to be thrown into the space above the dehairing elements and below the conveyer while entering the machine after being delivered by one of the flights 47 of the conveyer, thus causing the same to be damaged by the conveyer mechanism. In order to avoid this suitable mechanism is provided for closing the space between the upper portions of the dehairing elements and the lower portions of the conveyer mechanism. This means comprises a trap door 79 hinged at 80 to the transversely extending angle 81 which is suitably mounted on the framework. The trap door 79 is provided with suitably cutout portions 82 to accommodate the sprockets 43 and chains 44, and is normally held in the position shown in Figs. 3 and 6 by means of the counter-weights 83 which are provided with suitable flexible members 84 passing over the pulleys 85 journaled in the brackets 86 secured to one of the angles 87 extending transversely of the framework of the machine at the top thereof. The ends of the flexible members 84 opposite the counter-weights 83 are secured to the trap door at 87, thus tending to pull the same upwardly against the shaft 42, which acts as a stop to hold the trap door in closed position. When one of the flights 47 of the conveyer strikes the door 79 it will be thrown downwardly and the flight 47 will pass by the same and as soon as the flight 47 has cleared the trap door the counter-weights 83 will again pull the trap door 79 upwardly into the proper position to close the opening above referred to. The lower dehairing elements 21 comprise a disk-like base member 88 which operates in the socket 20 having depressions 89 formed therein which have beveled walls 90 and 91. Bolted to the walls 90 are dehairing elements 92 made of flexible material such as belting. Riveted to the outer end portions of the flexible dehairing elements 92 are the metallic scrapers 93. Riveted to the flexible elements 92 together with the scrapers 93 and on the side of the elements 92 opposite that of the scrapers 93 is the flexible reinforcing element 94, which is made of belting or similar material, and which is adapted to slide on the surface of the disk 88. In this way a dehairing element is provided that is provided with a flexible reinforcing element thus giving in effect a resilient mounting for the dehairing element. The upper dehairing elements 28 comprise spiders 95 having radial arms terminating in non-radially rearwardly inclined portions 96 and rearwardly curved end portions 97. Riveted to the portions 96 are the flexible beaters 98 which have mounted on the ends thereof the metallic scrapers 99. The arms of the spiders are curved as at 97 to provide a reinforcement for the beaters 98, such that while the beaters are reinforced yet they will be permitted to bend on a gradual curve so as to prevent breaking thereof at the point of flexure.

It is understood, of course, that the sides of the machine are suitably inclosed and that the machine is closed at the top and is provided in the upper portions thereof with suitable spraying apparatus to aid in cleaning the hogs, such as is commonly used in machines of this character. In order to close the opening where the hog enters the machine a flexible curtain 100 is provided.

The operation of the machine in dehairing the hog is as follows:

The carcass is moved up the slide-way 48 by means of one of the flights 47 and after reaching the turning point of the conveyer at the upper end thereof drops by gravity into the machine and into position on the supporting arms 61 and 66 and rests on the dehairing elements 21. While the carcass is in this position the high portions of the cams 64 are in engagement with the rollers 63 and the arms are in their raised or normal supporting position. While the carcass is in this position the arms 70 and the upper beaters constantly turn the hog and the lower beaters turning in pairs in opposite directions as previously described together with the upper beaters clean and dehair the carcass. When the rollers 63 come in contact with the low points on the cams the arms supporting the carcass drop to a lower position as shown in Fig. 6, and the arms 70 of the spiders grasp the carcass and eject it from the machine to the left as shown in Fig. 6. The arms then return to their normal supporting position and the conveyer again drops a carcass in the machine. The speed of the various parts is so proportioned that a carcass cannot enter the machine until after the cleaned carcass is ejected and when the ejecting mechanism is thrown out of operation the conveyer is also stopped, thus preventing two carcasses from entering the machine at one time. It is however, to be understood that in referring to a carcass as above the carcass of a large hog is meant. When pigs are being dehaired two carcasses may enter the machine at one time and only two of the rotating disk-like dehairing elements operate on each of the pigs, one being at one side of the machine and the other at the other side thereof. When the carcasses are in the normal dehairing position in the machine they touch only the lower half of the beater and do not touch the upper part thereof and the spiders lift and rotate the hog so as to present all parts thereof to the dehairing elements. The arrangement of the dehairing elements and the speed at which they can run makes it possible to deliver a lighter blow to the carcass which does better cleaning and prevents bruising of the carcass. By the rotating rubbing or massaging motion of the lower dehairing elements the toe nails or claws and the hair under the arm pits of the carcass are readily removed. It is possible to operate the dehairing elements in the present machine at a speed of 300 revolutions per minute, whereas the speed of beaters of the slapping type cannot exceed 195 revolutions per minute without bruising the carcass.

The supporting arms are bent so as to be spaced from the dehairing elements so that the intervening space follows the contour of the body of the hog. The arms are spaced both from the top and sides of the machine different distances. The arms on the upper beater must be flexible to allow a large hog to go through the space between the beaters and the supporting elements, when being discharged. The shape of the arms of the spiders that form the ejecting apparatus is important, as the curve thereof prevents injury to the carcass and due to its hook-like shape aids in throwing out the hog without tending to throw the same backwardly toward the entrance into the machine when the arms are acting as turning means. Both sets of the beaters operate at all times and do not have to stop to let the carcass out. The top beaters aid in holding a large carcass down on the dehairing elements. The hair cleaned from the carcasses falls down through the space between the supporting arms and between the spokes or arms of the spiders. Due to the rapid rotation of the dehairing elements and the different types of dehairing elements used, it is possible to operate the machine with much less power than has previously been customary.

Having thus described my invention what I claim and desire to secure by U. S. Letters Patent is:

1. In a machine of the character described carcass supporting means, dehairing elements adapted to operate on the carcass while in position on said supporting means, and means for automatically ejecting said carcass independent of said supporting means.

2. In a machine of the character described carcass supporting means, dehairing elements adapted to operate on the carcass while in position on said supporting means, and means for automatically ejecting said carcass independent of said supporting means and of said dehairing elements.

3. In a machine of the character described pivoted carcass supporting means, dehairing elements adapted to operate on the carcass while in position on said supporting means, and means for turning said carcass independent of said supporting means.

4. In a machine of the character described carcass supporting means pivoted at one end thereof, means for holding the supporting means in its normal supporting position, dehairing elements adapted to operate on the carcass while in position on said supporting means, and means for turning said carcass independent of said supporting means.

5. In a machine of the character described carcass supporting means, dehairing elements adapted to operate on the carcass while in position on said supporting means, and means for ejecting said carcass from the machine independent of said supporting means.

6. In a machine of the character described carcass supporting means, dehairing elements adapted to operate on the carcass while in position on said supporting means, and means for ejecting said carcass from the machine independent of said supporting means, said supporting means being adapted to be lowered from its normal supporting position to permit said ejecting means to throw out said carcass.

7. In a machine of the character described carcass supporting means comprising a plurality of arms, dehairing elements adapted to operate on said carcass while in position on said supporting means, and means for turning said carcass independent of said supporting means.

8. In a machine of the character described carcass supporting means comprising a plurality of arms, dehairing elements adapted to operate on said carcass while in position on said supporting means, and means for turning said carcass independent of said supporting means, said turning means comprising spiders having arms projecting between said supporting arms.

9. In a machine of the character described carcass supporting means, dehairing elements adapted to operate on the carcass while in position on said supporting means, and means for turning said carcass independent of said supporting means, said supporting means and dehairing elements providing a pocket for receiving said carcass.

10. In a machine of the character described carcass supporting means, dehairing elements adapted to operate on the carcass while in position on said supporting means, and means for turning said carcass independent of said supporting means, said supporting means and dehairing elements providing a V-shaped pocket for receiving said carcass.

11. In a machine of the character described carcass supporting means, dehairing elements adapted to operate on the carcass while in position on said supporting means, and means for turning said carcass independent of said supporting means, said carcass supporting means conforming to the contour of said carcass.

12. In a machine of the character described carcass supporting means comprising a plurality of arms, dehairing elements adapted to operate on said carcass while in position on said supporting means, and means for turning said carcass independent of said supporting means, said carcass supporting arms conforming to the contour of said carcass.

13. In a machine of the character described carcass supporting means, dehairing elements adapted to operate on said carcass while in position on said supporting means, and means for turning and ejecting said carcass independent of said supporting means.

14. In a machine of the character described carcass supporting means, dehairing elements adapted to operate on said carcass while in position on said supporting means, and means for turning and ejecting said carcass independent of said supporting means, said carcass supporting means conforming to the contour of said carcass.

15. In a machine of the character described carcass supporting means, dehairing elements adapted to operate on said carcass while in position on said supporting means, and means for turning and ejecting said carcass independent of said supporting means and of said dehairing elements.

16. In a machine of the character described pivoted carcass supporting means, dehairing elements adapted to operate on said carcass while in position on said supporting means, and means for turning and ejecting said carcass independent of said supporting means.

17. In a machine of the character described carcass supporting means pivoted at one end thereof, means for holding the supporting means in its normal supporting position, dehairing elements adapted to operate on said carcass while in position on said supporting means, and means for turning and ejecting said carcass independent of said supporting means.

18. In a machine of the character described carcass supporting means pivoted at one end thereof, means for holding the supporting means in its normal supporting position, means for depressing said supporting means, dehairing elements adapted to operate on said carcass while in position on said supporting means, and means for turning and ejecting said carcass independent of said supporting means.

19. In a machine of the character described carcass supporting means pivoted at one end thereof, means for holding the supporting means in its normal supporting position, means for periodically depressing said supporting means, dehairing elements adapted to operate on said carcass while in position on said supporting means, and means for turning and ejecting said carcass independent of said supporting means.

20. In a machine of the character described carcass supporting means pivoted at one end thereof, means for holding the supporting means in its normal supporting position, means for periodically depressing said supporting means, dehairing elements adapted to operate on the carcass while in position on said supporting means, and means for turning said carcass independent of said supporting means.

21. In a machine of the character described carcass supporting means, dehairing elements adapted to operate on the carcass while in position on said supporting means, means for periodically depressing said supporting means, and means for turning said carcass independent of said supporting means.

22. In a machine of the character described pivoted carcass supporting means, dehairing elements adapted to operate on the carcass while in position on said supporting means, and means for ejecting said carcass from the machine independent of said supporting means.

23. In a machine of the character described carcass supporting means pivoted at one end thereof, means for holding the supporting means in its normal supporting position, dehairing elements adapted to operate on the carcass while in position on said supporting means, and means for ejecting said carcass from the machine independent of said supporting means.

24. In a machine of the character described pivoted carcass supporting means, dehairing elements adapted to operate on the carcass while in position on said supporting means, and means for ejecting said carcass from the machine independent of said supporting means, said supporting means being adapted to be lowered from its normal supporting position to permit said ejecting means to throw out said carcass.

25. In a machine of the character described carcass supporting means pivoted at one end thereof, means for holding the supporting means in its normal supporting position, dehairing elements adapted to operate on the carcass while in position on said supporting means, and means for ejecting said carcass from the machine independent of said supporting means, said supporting means being adapted to be lowered from its normal supporting position to permit said ejecting means to throw out said carcass.

26. In a machine of the character described pivoted carcass supporting means, dehairing elements adapted to operate on the carcass while in position on said supporting means, and means for turning said carcass independent of said supporting means, said supporting means and dehairing elements providing a pocket for receiving said carcass.

27. In a machine of the character described carcass supporting means pivoted at one end thereof, means for holding the supporting means in its normal supporting position, dehairing elements adapted to operate on the carcass while in position on said supporting means, and means for turning said carcass independent of said supporting means, said supporting means and dehairing elements providing a pocket for receiving said carcass.

28. In a machine of the character described carcass supporting means pivoted at one end thereof, means for holding the supporting means in its normal supporting position, dehairing elements adapted to operate on the carcass while in position on said supporting means, and means for turning said carcass independent of said supporting means, said supporting means and dehairing elements providing a V-shaped pocket for receiving said carcass.

29. In a machine of the character described carcass supporting means pivoted at one end thereof, means for holding the supporting means in its normal supporting position, dehairing elements adapted to operate on the carcass while in position on said supporting means, and means for turning said carcass independent of said supporting means, said carcass supporting means conforming to the contour of said carcass.

30. In a machine of the character described carcass supporting means, dehairing elements adapted to operate on the carcass while in position on said supporting means, and means for turning said carcass independent of said supporting means, said carcass supporting means conforming to the contour of said carcass and forming a V-shaped pocket with said dehairing elements to receive said carcass.

31. In a machine of the character described carcass supporting means pivoted at one end thereof, means for holding the supporting means in its normal supporting position, dehairing elements adapted to operate on the carcass while in position on said supporting means, means for periodically depressing said supporting means, and means for turning said carcass independent of said supporting means.

32. In a machine of the character described carcass supporting means pivoted at one end thereof, means for holding the supporting means in its normal supporting position, dehairing elements adapted to operate on the carcass while in position on said supporting means, means for periodically depressing said supporting means, and means for ejecting said carcass from the machine independent of said supporting means.

33. In a machine of the character described carcass supporting means, dehairing elements adapted to operate on the carcass while in position on said supporting means, and means for turning said carcass independent of said supporting means, said supporting means and dehairing elements providing a wedge shaped recess for receiving said carcass.

34. In a machine of the character described carcass supporting means pivoted at one end thereof, means for holding the supporting means in its normal supporting position, dehairing elements adapted to operate on the carcass while in position on said supporting means, and means for turning said carcass independent of said supporting means, said supporting means and dehairing elements providing a wedge shaped recess for receiving said carcass.

35. In a machine of the character described carcass supporting means pivoted at one end thereof, means for holding the supporting means in its normal supporting position, dehairing elements adapted to operate on the carcass while in position on said supporting means, and means for turning said carcass independent of said supporting means, said supporting means and dehairing elements providing a wedge shaped recess for receiving said carcass, said carcass supporting means conforming to the contour of said carcass.

36. In a machine of the character described carcass supporting means, dehairing elements adapted to operate on the carcass while in position on said supporting means, and means for ejecting said carcass from the machine independent of said supporting means, said supporting means and dehairing elements providing a wedge shaped recess for receiving said carcass.

37. In a machine of the character described carcass supporting means, dehairing elements adapted to operate on the carcass while in position on said supporting means, and means for ejecting said carcass from the machine independent of said supporting means, said supporting means and dehairing elements providing a wedge shaped recess for receiving said carcass, said carcass supporting means conforming to the contour of said carcass.

38. In a machine of the character described carcass supporting means, dehairing elements adapted to operate on said carcass while in position on said supporting means, and means for turning and ejecting said carcass independent of said supporting means, said supporting means and dehairing elements providing a wedge shaped recess for receiving and holding said carcass in position to be acted on by said dehairing elements.

39. In a machine of the character described carcass supporting means, dehairing elements adapted to operate on said carcass while in position on said supporting means, and means for turning and ejecting said carcass independent of said supporting means, said supporting means and dehairing elements providing a wedge shaped recess for receiving and holding said carcass in position to be acted on by said dehairing elements, said carcass supporting means conforming to the contour of said carcass.

40. In a machine of the character described carcass supporting means pivoted at one end thereof, means for holding the supporting means in its normal supporting position, dehairing elements adapted to operate on said carcass while in position on said supporting means, and means for turning and ejecting said carcass independent of said supporting means, said supporting means and dehairing elements providing a wedge shaped recess for receiving and holding said carcass in position to be acted on by said dehairing elements.

41. In a machine of the character described carcass supporting means pivoted at one end thereof, means for holding the supporting means in its normal supporting position, means for depressing said supporting means, dehairing elements adapted to operate on said carcass while in position on said supporting means, and means for turning and ejecting said carcass independent of said supporting means, said supporting means and dehairing elements providing a wedge shaped recess for receiving and holding said carcass in position to be acted on by said dehairing elements.

42. In a machine of the character described carcass supporting means pivoted at one end thereof, means for holding the supporting means in its normal supporting position, means for periodically depressing said supporting means, dehairing elements adapted to operate on said carcass while in position on said supporting means, and means for turning and ejecting said carcass independent of said supporting means, said supporting means and dehairing elements providing a wedge shaped recess for receiving and holding said carcass in position to be acted on by said dehairing elements, said carcass supporting means conforming to the contour of said carcass.

43. In a device of the character described carcass supporting means, dehairing elements adapted to operate on said carcass while in position on said supporting means, and means for turning said carcass independent of said supporting means, said carcass turning means being adapted to eject said carcass from said machine when said supporting means is removed.

44. In a device of the character described carcass supporting means, dehairing elements adapted to operate on said carcass while in position on said supporting means, means for turning said carcass independent of said supporting means, said carcass turning means being adapted to eject said carcass from said machine when said supporting means is removed, and means for periodically removing said supporting means.

45. In a device of the character described carcass supporting means, dehairing elements adapted to operate on said carcass while in position on said supporting means, means for turning said carcass independent of said supporting means, said carcass turning means being adapted to eject said carcass from said machine when said supporting means is removed, and means for periodically removing said supporting means, said supporting means and said dehairing elements providing a wedge shaped recess for receiving and holding said carcass in position to be acted on by said dehairing elements.

46. In a device of the character described carcass supporting means, dehairing elements adapted to operate on said carcass while in position on said supporting means, means for turning said carcass independent of said supporting means, said carcass turning means being adapted to eject said carcass from said machine when said supporting means is removed, and means for periodically removing said supporting means, said supporting means and said dehairing elements providing a wedge shaped recess for receiving and holding said carcass in position to be acted on by said dehairing elements, said carcass supporting means conforming to the contour of said carcass.

47. In a machine of the character described carcass supporting means adapted to be swung into and out of operative position, dehairing elements adapted to operate on said carcass while in position on said supporting means, and means for turning said carcass independent of said supporting means, said turning means being adapted to eject said carcass from said machine when said supporting means is swung out of operative position.

48. In a machine of the character described carcass supporting means adapted to be swung into and out of operative position, dehairing elements adapted to operate on said carcass while in position on said supporting means, means for turning said carcass independent of said supporting means, said turning means being adapted to eject said carcass from said machine when said supporting means is swung out of operative position, and means for periodically swinging said supporting means into and out of operative position.

49. In a machine of the character described carcass supporting means adapted to be swung into and out of operative position, dehairing elements adapted to operate on said carcass while in position on said supporting means, means for turning said carcass independent of said supporting means, said turning means being adapted to eject said carcass from said machine when said supporting means is swung out of operative position, and means for periodically swinging said supporting means into and out of operative position, said supporting means and said dehairing elements providing a wedge shaped recess for receiving and holding said carcass in position to be acted on by said dehairing elements.

50. In a machine of the character described removable carcass supporting arms, dehairing elements adapted to operate on said carcass while in position on said supporting arms, and means for turning said carcass independent of said supporting arms, said carcass turning means being adapted to eject said carcass from said machine when said supporting arms are removed.

51. In a machine of the character described removable carcass supporting arms, dehairing elements adapted to operate on said carcass while in position on said supporting arms, and means for turning said carcass independent of said supporting arms, said carcass turning means being adapted to eject said carcass from said machine when said supporting arms are removed, and means for periodically removing said supporting arms.

52. In a machine of the character described removable carcass supporting arms, dehairing elements adapted to operate on said carcass while in position on said supporting arms, and means for turning said carcass independent of said supporting arms, said carcass turning means being adapted to eject said carcass from said machine when said supporting arms are removed, and means for periodically removing said supporting arms, said supporting arms moving as a unit.

53. In a machine of the character described removable carcass supporting arms, dehairing elements adapted to operate on said carcass while in position on said supporting arms, and means for turning said carcass independent of said supporting arms, said carcass turning means being adapted to eject said carcass from said machine when said supporting arms are removed, and means for periodically removing said supporting arms, said supporting arms collectively conforming to the contour of said carcass.

54. In a machine of the character described carcass supporting arms adapted to be swung into and out of operative position, dehairing elements adapted to operate on said carcass while in position on said supporting arms, and means for turning said carcass independent of said supporting arms, said turning means being adapted to eject said carcass from said machine, when said supporting arms are swung out of operative position.

55. In a machine of the character described carcass supporting arms adapted to be swung into and out of operative position, dehairing elements adapted to operate on said carcass while in position on said supporting arms, means for turning said carcass independent of said supporting arms, said turning means being adapted to eject said carcass from said machine when said supporting arms are swung out of operative position, and means for periodically swinging said supporting arms into and out of operative position.

56. In a machine of the character described carcass supporting arms adapted to be swung into and out of operative position, dehairing elements adapted to operate on said carcass while in position on said supporting arms, means for turning said carcass independent of said supporting arms, said turning means being adapted to eject said carcass from said machine when said supporting arms are swung out of operative position, and means for periodically swinging said supporting arms into and out of operative position, said supporting arms collectively conforming to the contour of said carcass.

57. In a machine of the character described pivoted carcass supporting arms adapted to be swung into and out of operative position, dehairing elements adapted to operate on said carcass while in position on said supporting arms, and means for turning said carcass independent of said supporting arms, said turning means being adapted to eject said carcass from said machine when said supporting arms are swung out of operative position.

58. In a machine of the character described curved carcass supporting arms adapted to be swung into and out of operative position, dehairing elements adapted to operate on said carcass while in position on said supporting arms, and means for turning said carcass independent of said supporting arms, said turning means being adapted to eject said carcass from said machine when said supporting arms are swung out of operative position.

59. In a machine of the character described carcass supporting arms certain of said arms pivoted at the ends thereof said arms being adapted to be swung into and out of operative position, dehairing elements adapted to operate on said carcass while in position on said supporting arms, and means for turning said carcass independent of said supporting arms, said turning means being adapted to eject said carcass from said machine when said supporting arms are swung out of operative position.

60. In a machine of the character described carcass supporting arms adapted to be swung into and out of operative position, dehairing elements adapted to operate on said carcass while in position on said supporting arms, and means for turning said carcass independent of said supporting arms, said turning means projecting between said supporting arms and being adapted to eject said carcass from said machine when said supporting arms are swung out of operative position.

61. In a machine of the character described carcass supporting arms adapted to be swung into and out of operative position, dehairing elements adapted to operate on said carcass while in position on said supporting arms, and means for turning said carcass independent of said supporting arms, said turning means projecting between said supporting arms and being adapted to eject said carcass from said machine when said supporting arms are swung out of operative position, and means for periodically swinging said supporting arms into and out of operative position.

62. In a machine of the character described carcass supporting arms, certain of said arms being pivoted at one end thereof, said arms being adapted to be swung into and out of operative position, dehairing elements adapted to operate on said carcass while in position on said supporting arms, and means for turning said carcass independent of said supporting arms said turning means projecting between said supporting arms and being adapted to eject said carcass from said machine when said supporting arms are swung out of operative position.

63. In a machine of the character described curved pivoted carcass supporting arms adapted to be swung into and out of operative position, dehairing elements adapted to operate on said carcass while in position on said supporting arms, and means for turning said carcess independent of said supporting arms, said turning means being adapted to eject said carcass from said machine when said supporting arms are swung out of operative position.

64. In a machine of the character described carcass supporting arms adapted to be swung into and out of operative position, dehairing elements adapted to operate on said carcass while in position on said supporting arms, and means for turning said carcass comprising a plurality of arms turning on a common axis and projecting between said supporting arms.

65. In a machine of the character described carcass supporting arms adapted to be swung into and out of operative position, dehairing elements adapted to operate on said carcass while in position on said supporting arms, and means for turning said carcass comprising a plurality of arms turning on a common axis and projecting between said supporting arms, said turning means being adapted to eject said carcass from said machine when said supporting arms are swung out of operative position.

66. In a machine of the character described carcass supporting arms adapted to be swung into and out of operative position, dehairing elements adapted to operate on said carcass while in position on said supporting arms, and means for turning said carcass comprising a plurality of substantially radially extending curved arms turning on a common axis and projecting between said supporting arms.

67. In a machine of the character described carcass supporting arms adapted to be swung into and out of operative position, dehairing elements adapted to operate on said carcass while in position on said supporting arms, and means for turning said carcass comprising a plurality of spiders each having a plurality of arms mounted to turn on a common axis, said last mentioned arms projecting between said supporting arms.

68. In a machine of the character described carcass supporting arms adapted to be swung into and out of operative position, dehairing elements adapted to operate on said carcass while in position on said supporting arms, and means for turning said carcass comprising a plurality of spiders each having a plurality of arms mounted to turn on a common axis, said last mentioned arms projecting between said supporting arms, said turning means adapted to eject said carcass from said machine when said supporting arms are swung out of operative position.

69. In a machine of the character described carcass supporting arms adapted to be swung into and out of operative position, dehairing elements adapted to operate on said carcass while in position on said supporting arms, and means for turning said carcass comprising a plurality of spiders mounted to turn on a common axis, said spiders each having a plurality of substantially radially extending curved arms projecting between said supporting arms.

70. In a machine of the character described carcass supporting arms adapted to be swung into and out of operative position, dehairing elements adapted to operate on said carcass while in position on said supporting arms, and means for turning said carcass comprising a plurality of spiders mounted to turn on a common axis, said spiders each having a plurality of substantially radially extending curved arms projecting between said supporting arms, said curved arms forming hooks adapted to grasp and eject said carcass from said machine when said supporting arms are swung out of operative position.

71. In a machine of the character described carcass supporting means adapted to be swung into and out of operative position, dehairing elements adapted to operate on said carcass while in position on said supporting means, means for turning said carcass independent of said supporting means, said turning means being adapted to eject said carcass from said machine when said supporting means is swung out of operative position, means for periodically swinging said supporting means into and out of operative position, and means whereby the means for swinging said supporting means can be thrown out of operation to maintain said supporting means in supporting position.

72. In a machine of the character described carcass supporting arms adapted to be swung into and out of operative position, dehairing elements adapted to operate on said carcass while in position on said supporting arms, means for turning said carcass independent of said supporting arms, said turning means being adapted to eject said carcass from said machine, when said supporting arms are swung out of operative position, means for periodically swinging said supporting arms into and out of operative position, and means whereby the means for swinging said supporting arms can be thrown out of operation to maintain said supporting arms in operative position.

73. In a machine of the character described a carcass supporting member comprising arms pivotally supported at one end thereof, the other ends of said arms being free, and a support for each of said arms between the pivot and the free end thereof, said supports being adapted to hold said arms in their normal operative position and being adapted to be lowered to lower said arms periodically.

74. In a machine of the character described a carcass supporting member comprising arms pivotally supported at one end thereof, the other ends of said arms being free, and a cam for supporting each of said arms between the pivot and the free ends thereof, said cams being adapted to hold said arms in their normal operative position and to lower said arms periodically.

75. In a machine of the character described a carcass supporting member comprising supporting arms, certain of said arms being pivotally supported at one end thereof, the other ends of said arms being free, carcass ejecting arms operating between said supporting arms, and a support for each of said pivoted arms between the pivot and the free end thereof, said supports being adapted to hold said supporting arms in their normal operative position and to lower said supporting arms periodically to bring the carcass into coöperative relation with said ejecting arms.

76. In a machine of the character described a carcass supporting member comprising supporting arms, certain of said arms being pivotally supported at one end thereof, the other ends of said arms being free, carcass ejecting arms operating between said supporting arms, and a cam for supporting each of said pivoted arms between the pivot and the free end thereof, said cams being adapted to hold said supporting arms in their normal supporting position and to lower said supporting arms periodically to bring the carcass into coöperative relation with said ejecting arms.

77. In a dehairing machine, carcass supporting means and inclined dehairing elements adapted to operate on said carcass while in position on said supporting means with a rotary rubbing motion, said dehairing elements being arranged in pairs the elements of each pair rotating in the same direction and those of adjacent pairs rotating in opposite directions, whereby the adjacent peripheries of the elements of the adjacent pairs will be moving downwardly as said elements rotate.

78. In a machine of the character described, a framework, a plurality of spaced parallel carcass supporting arms, a transverse shaft connecting said arms, certain of said arms having extensions pivoted to said framework, said arms being provided with enlargements providing rollers, a transverse shaft parallel to said first mentioned shaft, cams on said shaft upon which certain of said rollers are adapted to rest, said arms being held in normal carcass supporting position when said rollers are in engagement with the high portion of said cam and means for rotating said cam shaft to bring the low parts of said cams into engagement with said rollers to periodically depress said carcass supporting arms.

79. In a machine of the character described, a framework, a plurality of spaced parallel carcass supporting arms, a transverse shaft connecting said arms, certain of said arms having extensions pivoted to said framework, said arms being provided with enlargements providing rollers, a transverse shaft parallel to said first mentioned shaft, cams on said shaft upon which certain of said rollers are adapted to rest, said arms being held in normal carcass supporting position when said rollers are in engagement with the high portion of said cam, dehairing elements adapted to operate on said carcass while in position on said supporting means, means for turning said carcass, and means for rotating said cam shaft to bring the low parts of said cams into engagement with said rollers to periodically depress said carcass supporting arms, whereupon said turning means is adapted to eject said carcass from said machine.

80. In a machine of the character described, a framework, a plurality of spaced parallel carcass supporting arms, a transverse shaft connecting said arms, certain of said arms having extensions pivoted to said framework, said arms being provided with enlargements providing rollers, a transverse shaft parallel to said first mentioned shaft, cams on said shaft upon which certain of said rollers are adapted to rest, said arms being held in normal carcass supporting position when said rollers are in engagement with the high portion of said cam, dehairing elements adapted to operate on said carcass while in position on said supporting means, means for turning said carcass, means for rotating said cam shaft to bring the low parts of said cams into engagement with said rollers to periodically depress said carcass supporting arms whereupon said turning means is adapted to eject said carcass from said machine, and means for temporarily halting the rotation of said shaft when said rollers are in engagement with the high part of said cams.

81. In a dehairing machine, carcass supporting means, lower dehairing elements and upper beaters adapted to operate on said carcass while in position on said supporting means, said beaters serving to hold said carcass in coöperative relation with said lower dehairing elements and on said supporting means.

82. In a dehairing machine, carcass supporting means, lower dehairing elements and upper beaters adapted to operate on said carcass while in position on said supporting means, said beaters serving to hold said carcass in coöperative relation with said lower dehairing elements and on said supporting means, said lower dehairing elements operating on said carcass with a rotary rubbing motion.

83. In a dehairing machine, carcass supporting means, lower dehairing elements and upper beaters adapted to operate on said carcass while in position on said supporting means, said lower dehairing elements and said supporting means providing a wedge shaped recess to receive said carcass to be operated on by said dehairing elements and said beaters serving to hold said carcass in said recess.

84. In a dehairing machine, carcass supporting means, lower dehairing elements and upper beaters adapted to operate on said carcass while in position on said supporting means, said lower dehairing elements and said supporting means providing a wedge shaped recess to receive said carcass to be operated on by said dehairing elements and said beaters having a rotary slapping action which serves to hold said carcass in said recess.

85. In a dehairing machine, carcass supporting means, lower dehairing elements and upper beaters adapted to operate on said carcass while in position on said supporting means, said lower dehairing elements and said supporting means providing a wedge shaped recess to receive said carcass to be operated on by said dehairing elements and said beaters having a rotary slapping action which serves to hold said carcass in said recess, said lower dehairing elements operating on said carcass with a rotary rubbing motion.

86. In a machine of the character described carcass supporting means, dehairing elements adapted to operate on the carcass while in position on said supporting means, and means for lifting and turning said carcass independent of said supporting means and said dehairing elements.

87. In a machine of the character described removable carcass supporting means, dehairing elements adapted to operate on the carcass while in position on said supporting means, and means for lifting and turning said carcass independent of said supporting means and said dehairing elements and for ejecting said carcass upon removal of said supporting means.

88. In a dehairing machine, carcass supporting means, rotating arms for rotating and lifting said carcasses, dehairing elements and rotating beaters above said supporting means, said arms and beaters acting on the carcasses in opposite directions, whereby said carcasses are held in proper coöperative relation to said dehairing elements.

89. In a dehairing machine, carcass supporting means movable into and out of normal carcass supporting position, rotating arms for rotating and lifting said carcasses when in position on said supporting means, dehairing elements and rotating beaters above said supporting means, said arms and beaters acting on the carcasses in opposite directions, whereby said carcasses are held in proper coöperative relation to said dehairing elements when the supporting means is in its normal carcass supporting position.

90. In a dehairing machine, carcass supporting means movable into and out of normal carcass supporting position, rotating arms for rotating and lifting said carcasses when in position on said supporting means, dehairing elements and rotating beaters above said supporting means, said arms and beaters acting on the carcasses in opposite directions, whereby said carcasses are held in proper coöperative relation to said dehairing elements when the supporting means is in its normal carcass supporting position, said arms being adapted to eject said carcasses when the supporting means is moved out of supporting position.

91. In a dehairing machine, spaced carcass supporting elements, rotating arms projecting between said carcass supporting elements, and means for moving said supporting elements relative to said rotating arms, whereby the extreme end portions of said arms are adapted to project beyond said elements to turn and lift carcasses when said supporting elements are in one position and the major portions of said arms are adapted to engage said carcasses to eject said carcasses from said machine when said supporting elements are in a second position.

92. In a dehairing machine, carcass supporting means adapted to be swung into and out of supporting position, lower dehairing elements and upper beaters adapted to operate on said carcasses while in position on said supporting means, said lower beaters and said supporting means providing a wedge shaped recess to receive said carcasses to be operated on by said dehairing elements, said beaters having a rotary slapping action whereby they serve to hold said carcasses in said recess, and means for turning and lifting said carcasses while the supporting means is in supporting position, said means being adapted to eject said carcasses when said supporting means is swung out of supporting position.

93. In a dehairing machine, carcass supporting means adapted to be swung into and out of supporting position, lower dehairing elements and upper beaters adapted to operate on said carcasses while in position on said supporting means, said lower beaters and said supporting means providing a wedge shaped recess to receive said carcasses to be operated on by said dehairing elements, said beaters having a rotary slapping action whereby they serve to hold said carcasses in said recess, means for turning and lifting said carcasses while the supporting means is in supporting position, said means being adapted to eject said carcasses when said supporting means is swung out of supporting position, and means for periodically swinging said supporting means into and out of supporting position.

94. In a machine of the character described, means for conveying a carcass to said machine, comprising flexible members and pusher bars extending between said flexible members, means for supporting said conveyer means at said machine, said machine being provided with an opening below said support through which said pusher bars are adapted to pass after conveying said carcass into said machine, and means for closing said opening after said pusher bars have passed therethrough.

95. In a machine of the character described, means for conveying a carcass to said machine, comprising flexible members and pusher bars extending between said flexible members, means for supporting said conveyer means at said machine, said machine being provided with an opening below said support through which said pusher bars are adapted to pass after conveying said carcass into said machine, and a trap door for closing said opening after said pusher bars have passed therethrough.

96. A hog dehairing machine having a plurality of dehairing devices having flexible dehairing elements operating in a circular path of contact on the surface of the carcass throughout the entire travel of said dehairing elements, and flexible reinforcing elements for said dehairing elements.

97. A hog dehairing machine having a plurality of dehairing devices having flexible dehairing elements operating in a circular path of contact on the surface of the carcass throughout the entire travel of said dehairing elements, and flexible reinforcing elements for said dehairing elements, said reinforcing elements being secured to the dehairing elements at one end thereof and being slidably mounted at the other end thereof.

98. A dehairing device comprising a base member, flexible dehairing elements mounted on said base member, and flexible reinforcing elements for said dehairing elements.

99. A dehairing device comprising a base member, flexible dehairing elements mounted on said base member, and flexible reinforcing elements for said dehairing elements, said reinforcing elements being secured to said dehairing elements at the free ends thereof, and being slidably mounted on said base member.

100. In a dehairing machine of the character described, dehairing elements, carcass supporting means, means for moving said carcass supporting means periodically out of supporting position, means for turning and lifting said carcass adapted to eject said carcass from said machine when said supporting means is moved out of supporting position, means for conveying carcasses to said machine and means whereby said means for moving said carcass supporting means out of supporting position and said conveyer can be simultaneously thrown out of operation without affecting the operation of the dehairing elements and turning means.

101. In a dehairing machine, spaced carcass supporting elements, rotating arms projecting between said carcass supporting elements, and means for moving said supporting elements relative to said rotating arms, whereby the extreme end portions of said arms are adapted to project beyond said elements to turn and lift carcasses when said supporting elements are in one position and the major portions of said arms are adapted to engage said carcasses to eject said carcasses from said machine when said supporting elements are in a second position, the outermost of said arms at the sides of said machine being shorter than the remaining arms.

102. In a machine of the character described, carcass supporting arms adapted to be swung into and out of operative position, dehairing elements adapted to operate on said carcass while in position on said supporting arms, and means for turning said carcass comprising a plurality of spiders each having a plurality of arms mounted to turn on a common axis, said last mentioned arms projecting between said supporting arms, the hair that is removed being adapted to fall between said supporting arms and the arms of said spiders to the bottom of said machine.

103. A dehairing device comprising a supporting member provided with arms extending outwardly from the center thereof said arms having gradually curved end portions and flexible beaters carried by said arms and overlying the curved end portions of said arms.

104. A dehairing device comprising a supporting member adapted to be mounted for rotation on a shaft, arms extending outwardly from the center of said member, said arms having portions that are inclined to the radius of said supporting member and terminating in gradually curved end portions, and flexible beaters secured to the non radial portions of said arms and overlying and extending beyond the curved end portions thereof.

105. In a machine of the character described, carcass supporting means, dehairing elements adapted to operate on the carcass while in position on said supporting means, and means for ejecting said carcass independent of said supporting means and of said dehairing elements.

106. In a machine of the character described carcass supporting means, dehairing elements adapted to operate on the carcass while in position on said supporting means, and means for automatically ejecting said carcass independent of said supporting means and of said dehairing elements.

107. In a machine of the character described, carcass supporting means, said carcass supporting means comprising pivotally mounted arms, and dehairing elements adjacent one end of said arms, said arms being curved adjacent said dehairing elements and said dehairing elements being inclined to form a carcass receiving pocket therebetween and the ends of said arms remote from said dehairing elements being substantially straight.

108. In a machine of the character described, a plurality of horizontally spaced carcass supporting arms, and means for turning and ejecting said carcass comprising a rotatable shaft, a plurality of spiders keyed on said shaft, said spiders comprising a plurality of curved hook-like arms operating between adjacent supporting arms, said arms having a rear face of sharper curvature than the front face thereof and having bluntly curved ends.

109. In a machine of the character described carcass supporting means, dehairing elements adapted to operate on the carcasses while in position on said supporting means, and means for periodically ejecting said carcasses independent of said supporting means and of said dehairing elements, said dehairing elements rotating constantly without interruption thereof by the ejecting operation.

In witness whereof I hereunto subscribe my name this 9th day of September A. D., 1920.

ROBERT E. JORDAN.